(12) United States Patent
Zargari

(10) Patent No.: US 10,634,931 B1
(45) Date of Patent: Apr. 28, 2020

(54) EYEGLASSES AND STORAGE SYSTEM

(71) Applicant: Mishel Zargari, Los Angeles, CA (US)

(72) Inventor: Mishel Zargari, Los Angeles, CA (US)

( * ) Notice: Subject to any disclaimer, the term of this patent is extended or adjusted under 35 U.S.C. 154(b) by 185 days.

(21) Appl. No.: 15/417,025

(22) Filed: Jan. 26, 2017

Related U.S. Application Data

(60) Provisional application No. 62/287,086, filed on Jan. 26, 2016.

(51) Int. Cl.
*G02C 3/00* (2006.01)
*G02C 5/14* (2006.01)
*A45F 5/02* (2006.01)
*A47F 7/02* (2006.01)

(52) U.S. Cl.
CPC ............ *G02C 3/00* (2013.01); *A45F 5/02* (2013.01); *A47F 7/021* (2013.01); *G02C 5/143* (2013.01); *G02C 2200/02* (2013.01)

(58) Field of Classification Search
CPC ...... G02C 3/00; G02C 5/143; G02C 2200/02; A45F 5/02; A47F 7/021
See application file for complete search history.

(56) References Cited

U.S. PATENT DOCUMENTS

| | | | |
|---|---|---|---|
| 6,367,126 B1 | 4/2002 | Rivkin | |
| 6,843,562 B1* | 1/2005 | Ng | G02C 3/003 351/113 |
| 9,392,828 B2 | 7/2016 | Esagoff | |
| 2005/0144760 A1* | 7/2005 | Verbaas | A45F 5/02 24/3.1 |
| 2007/0064196 A1* | 3/2007 | Avery | G02C 3/04 351/112 |
| 2009/0250574 A1 | 10/2009 | Fullerton et al. | |

(Continued)

OTHER PUBLICATIONS

<https://www.amazon.com/totalElement-Magnetic-Fastener-Adhesive-10-Pack/dp/B00EHK287M/ref=sr_1_1?ie=UTF8&qid=1485396598&sr=8-1-spons&keywords=magnetic+badge&psc=1>, accessed Jan. 25, 2017.

(Continued)

*Primary Examiner* — William R Alexander
*Assistant Examiner* — Ephrem Z Mebrahtu
(74) *Attorney, Agent, or Firm* — Payam Moradian

(57) ABSTRACT

Provided is eyeglasses comprising: a) a front body for holding lenses and optionally one or more of the lenses; b) two temples, each temple having a first end and a second end, the first end attached to the front body, each of the second ends of the temples configured to rest on behind an ear, the second end of the temple having a cavity; c) a magnet placed in the cavity of the temple; wherein the eyeglasses are configured to form a magnetic connection with a metal that is attracted to a magnet. Provided are eyeglasses holding system comprising: a) a metal plate attracted to a magnet for wearing on outside of an article of clothing; b) one or more magnets for placing inside of the article of clothing; and c) eyeglasses with a front body for holding lenses and two temples, with at least one magnet in one of the two temples; wherein a user places the one or more magnets inside of the article of clothing and forms a first magnetic connection between the one or more magnets and the metal plate placed on the outside of the article of clothing, the first magnetic connection stabilizing the metal plate on the outside of the article of clothing, the stabilized metal plate configured for placing the eyeglasses though a second magnetic connection as needed by the user.

17 Claims, 6 Drawing Sheets

(56) References Cited

U.S. PATENT DOCUMENTS

2014/0022504 A1* 1/2014 Peterson .................. G02C 3/00
 351/155
2018/0125214 A1* 5/2018 Daly ........................ A45F 5/02

OTHER PUBLICATIONS

<https://www.amazon.com/CMS-Magnetics-Magnetic-Badges-Magnet/dp/B00KQA5VBW/ref=sr_1_8?ie=UTF8&qid=1485396844&sr=8-8&keywords=magnetic+badge+name>, accessed Jan. 25, 2017.
<https://www.amazon.com/ReadeREST-O1-SS-ReadeRest-Original-Stainless/dp/B00AWKYG8A/ref=sr_1_1_a_it?ie=UTF8&qid=1485396921&sr=8-1&keywords=reader%2Brest%2Beyeglass%2Bholder&th=1>, , accessed Jan. 25, 2017.

* cited by examiner

EYEGLASSES AND STORAGE SYSTEM

CROSS-REFERENCE

The present application claims the benefit of provisional application No. 62/287,086, filed on Jan. 26, 2016, which is incorporated herein by reference in its entirety.

BACKGROUND SECTION OF THE INVENTION

Users of eyewear frequently wish to remove them temporarily, which creates the problem of where to temporarily place the eyeglasses. Putting the eyeglasses in a pocket can scratch the lenses. Putting them on a table faced down can scratch the lens and can also limit the mobility of the user since the user may need the eyeglasses at another location away from the table. People also typically misplace or lose their eyeglasses. There is a need in the art for temporary storage of eyeglasses by a user in proximity to the user.

BRIEF DESCRIPTION OF THE OF THE DRAWINGS

SUMMARY SECTION OF THE INVENTION

Figure 1:
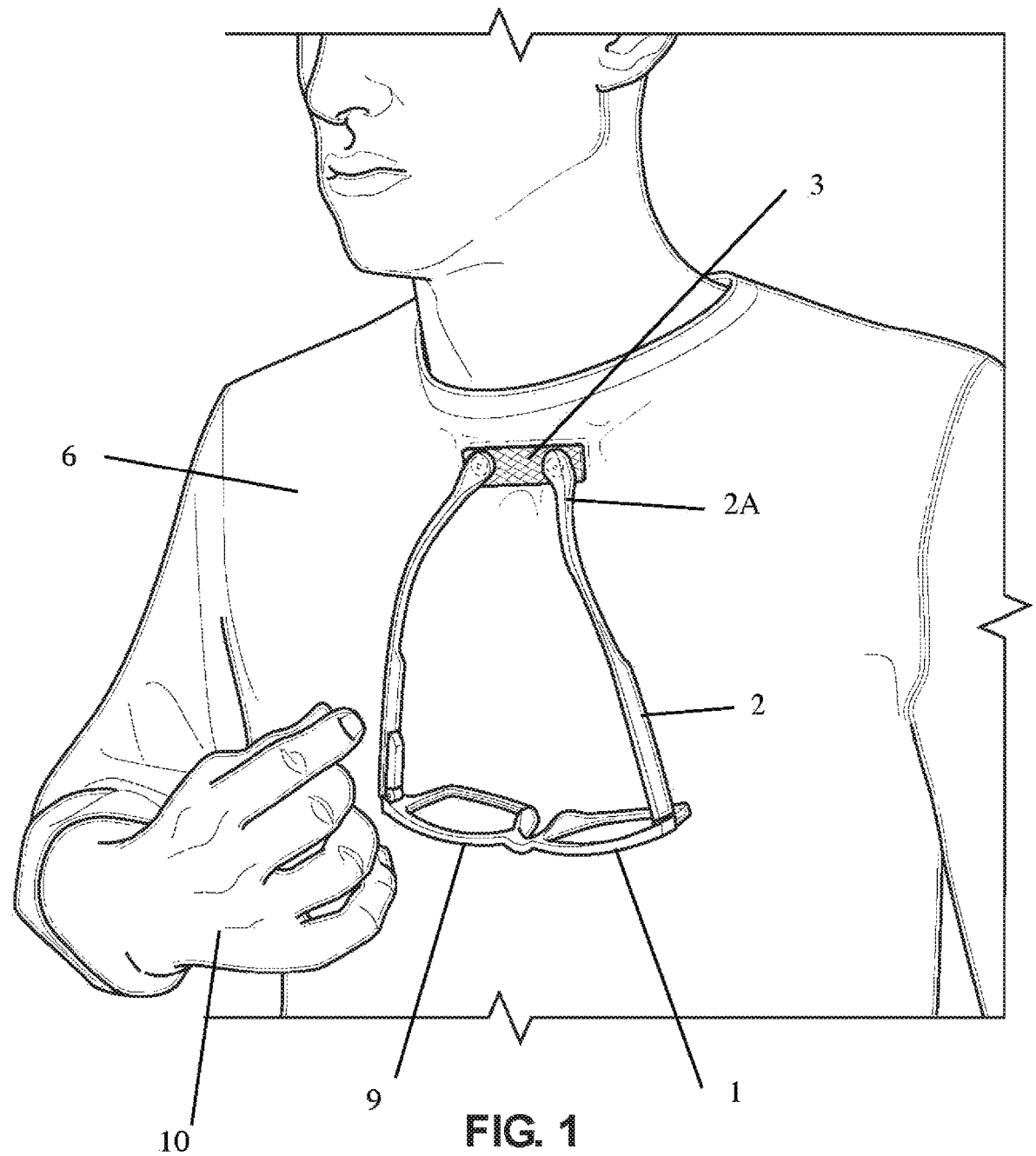
FIG. 1 illustrates a user storing the eyeglasses on a metal plate on the user's shirt with both temples making contact with the plate.

Provided is eyeglasses comprising: a) a front body for holding lenses and optionally one or more of the lenses; b) two temples, each temple having a first end and a second end, the first end attached to the front body, each of the second ends of the temples configured to rest on behind an ear, the second end of the temple having a cavity, c) a magnet placed in the cavity of the temple; wherein the eyeglasses are configured to form a magnetic connection with a metal that is attracted to a magnet. The magnets can be rare earth magnets (such as Neodymium). The eyeglasses can be configured to be attached and removed from the metal without a need for folding the eyeglasses. In the magnetic connection, the eyeglasses may not be folded. The magnet can be cylindrical. The magnet can be doughnut shaped. A surface of the magnet can be configured to make contact with the metal protrudes out of the cavity in relation to the end of the temple. A surface of the magnet can be configured to make contact with the metal is flat and is at an angle of plus 15 to minus 15 degrees relative to a horizontal plane when the eyeglasses are placed on a flat surface in a position that is worn by a person with the temples at open position. The second end of the temple can have the greatest thickness in a horizontal direction plane when the eyeglasses are placed on a flat surface in a position that is worn by a person with the temples at open position. Each of the temples can have only a single magnet for a total of two. The second end of each temple can be circular in a horizontal direction plane when the eyeglasses are placed on a flat surface in a position that is worn by a person with the temples at open position.

Provided are eyeglasses holding system comprising: a) a metal plate attracted to a magnet for wearing on outside of an article of clothing; b) one or more magnets for placing inside of the article of clothing; and c) eyeglasses with a front body for holding lenses and two temples, with at least one magnet in one of the two temples; wherein a user places the one or more magnets inside of the article of clothing and forms a first magnetic connection between the one or more magnets and the metal plate placed on the outside of the article of clothing, the first magnetic connection stabilizing the metal plate on the outside of the article of clothing, the stabilized metal plate (a magnetically saturable) configured for placing the eyeglasses though a second magnetic connection as needed by the user. The two magnets can be placed inside of the article of clothing. A non-metal casing can hold the two magnets. The metal plate can be flat. The metal plate may not be a magnet and does not hold a magnet inside. The metal plate and the magnets can be detachably attached to the temple in the package. The system can be packaged by having the one or more magnets and the metal plate forming an assembly, and then attaching the assembly to one of the temples with an adhesive sheet (such as a vinyl sheet with adhesive on one side).

Provided is a display for eyeglasses having a magnet comprising an inner layer of paper material, a outer layer of wood, and either of thumbtacks on the outer layer or a metal plate on the outer later, wherein the magnet can be attached to the thumbtack or the metal layer. The display can have at least two surfaces that are positioned at an angle to each other. The metal layer can have a plurality of openings. The paper layer is 3 to 4 mm and the wood layer is 3 to 8 inches.

DETAILED DESCRIPTION OF THE INVENTION

The present invention provides eyeglasses 9 that can be stored on a temporary basis on the user's article of clothing or another location. The user can place the eyeglasses on a metal plate worn by the user with only one hand in a single motion without the need to fold the eyeglasses. The user can then remove the glasses with one hand in a single motion without the need to unfold them. The eyeglasses hang from the metal plate on the user's clothing, with at most only one of the temples being folded. By folding the eyeglasses, it is meant that the at least one temple is pivoted towards the front of the eyeglasses and is positioned at an angle of less than 30 degrees relative to a straight line drawn from center of one hinge 19 to another hinge 19. The term folded typically means the eyeglasses are in a position that is suitable for placement in an eyeglass case.

Provided arc eyeglasses 9 with a front body 1 and two temples 2. One end (temple tip) of the temple 2A can have a magnet 4. The magnet 4 can have be any shape, including a round shape. The magnet 4 can be doughnut shaped or a solid cylinder. The magnet 4 can be placed inside of the temple end 2A with one of the surfaces (circular surface) of the magnet 5 exposed. The temple end 2A can have a cavity 5 that complements magnet 4. The temple cavity 5 holding the magnet 4 can have an angle of plus or minus 15 degrees relative to the horizontal plane (in all directions (360 degrees)) when the eyeglasses 9 are placed in an up-right open position (same position worn by a person) on a flat surface. The angle can be plus or minus 5 degrees, or alternatively zero degrees (in all directions). An open position refers to each temple being in a position of 60 degrees to 120 degrees in relation to a line drawn from center of one temple hinge 19 to another temple hinge 19.

The temple 2 an have a hinge at the end that it is attached to the front body 1. Each temple 2 is attached to one side of the front body 1. The temple 1 can have a substantially straight portion that includes the hinge. The temple end 2A positioned away from the front body 1 bends downwards and/or inwards from the straight portion of the temple 2. The temple end 2A increases in thickness as it moves away from the front body 1 with the temple end 2A having the greatest thickness configured to house magnet 4 (at the temple tip). In one embodiment, the temple 2 has a substantially straight profile with a uniform thickness from where the temple 2 is attached to front body 1 to where temple 2 starts to bend downward. When temple 2 starts to move downward, the temple 2 increases in thickness. The end of the temple 2A is circular and/or round in a horizontal plane. The temple end 2A comes both inward and downward to make it easier to put on and take off the eyeglasses 9, and also to create space for placing magnet 4.

The temple end 2A can have a cavity 5 configured for receiving a doughnut shaped magnet 4 (ring magnet or hollow cylinder with a central opening). Alternatively the cavity 5 can receive other shaped magnets, such as a solid circle shaped, square shaped, or oval shaped. The magnet 4 can be attached with an adhesive. The additional surface area in the middle of the magnet 4 creates better adhesion between the magnet 4 and temple end 2A. The material of the temple 2 (usually plastic) fills inside of the hole of magnet 4.

The diameter of the doughnut cavity 5/magnet 4 can be about 5 mm to about 12 mm, 6 mm to about 10 mm, such as about 8 mm (millimeter). The middle solid portion corresponding to the hole of the doughnut shaped magnet 4 can have a diameter of about 2 to about 4 mm. The temple end 2A casing around the magnet can be about 0.5 to about 2 mm, such as about 1 mm thick. The surface of the magnet configured to touch a metal plate can protrude out from the cavity 5 of the temple end 2A slightly, such as about 0.5 mm to about 2 mm, such as about 1 mm (raised one mm in relation to the temple end). The protrusion allows for easier assembling and disassembling of the temple end 2A with a metal plate 3.

A metal plate 3 worn on a person can be used to attach the magnet at the end of the temple to form an assembly. The metal plate can be flat and/or thin. The plate can have different geometric shapes such as rectangular, circular, square, and triangular. When rectangular, the length can be about 3 cm to about 5 cm, such as about 4.3 cm. The width can be about 1 cm to about 2 cm, such as about 1.3 cm (centimeter). The thickness can be about 1 mm to about 3 mm, such as about 2 mm. The plate 3 is made from a metal that is attracted to a magnet and capable of forming an assembly with a magnet 4 or 7. Examples of materials include (ferromagnetic)metals including iron, nickel, cobalt, and their alloys such as steel, and some versions of stainless steel. The metal plate 3 is not a magnet itself in this embodiment and does not have a magnet inside or attached to it. The metal plate 3 is placed on outside of the article of clothing 6.

Figure 2:
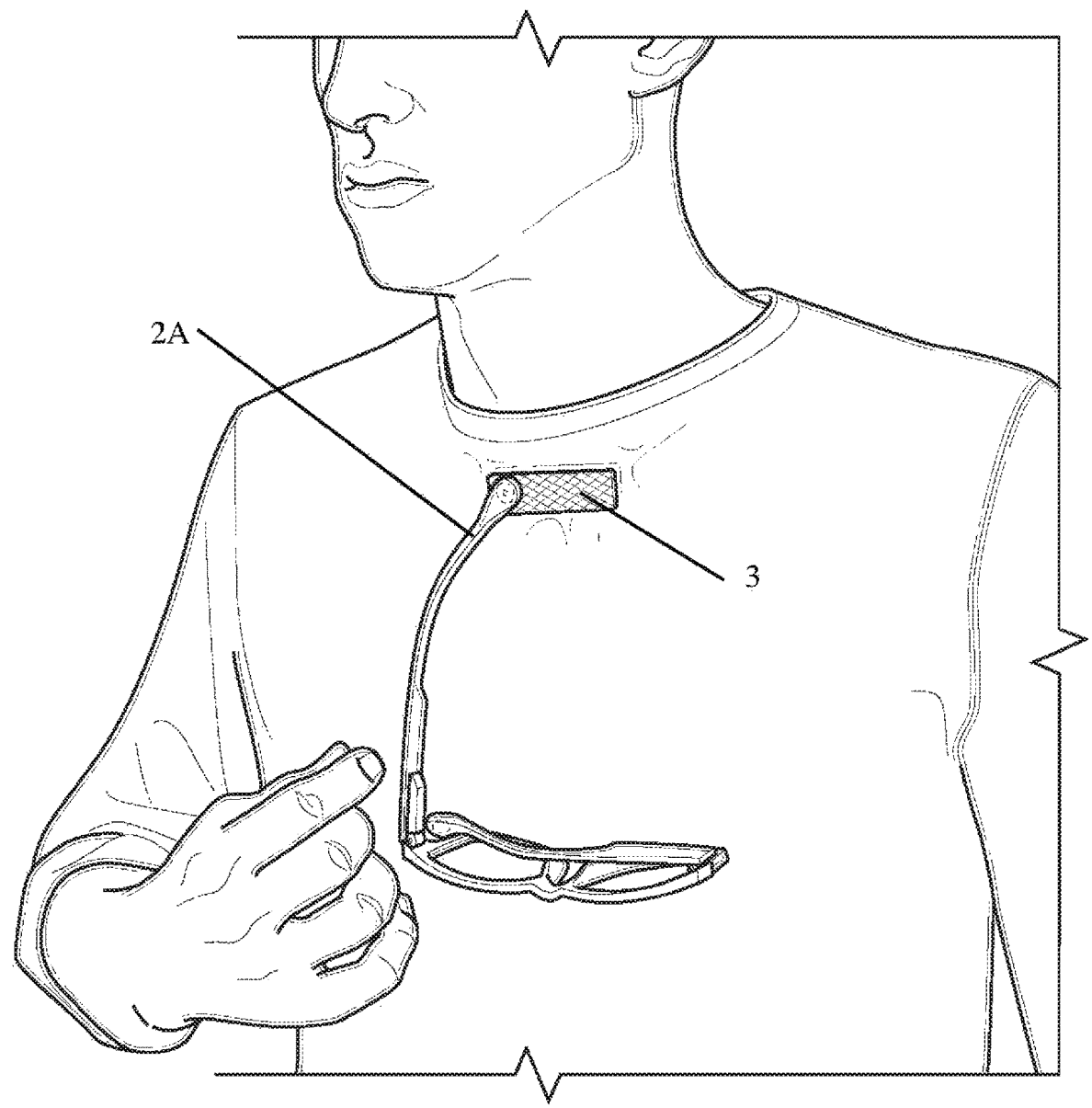
FIG. 2 illustrates a user storing the eyeglasses on a metal plate on the user's shirt with a single temple making contact with the plate.

A holder 8 can be used for keeping the metal plate 3 in a certain position. The holder 8 is placed inside of the article of clothing. The holder 8 can be made from a casing that is non-metal (such as plastic) holding one or more magnets. As illustrated in FIG. 2, the holder has two spaced apart circular magnets, which are placed in complementary circular cavities in the holder 8 casing. The magnets 7 protrude out slightly (raised about 0.5 mm to about 2 mm, such as about 1 mm) from the plastic casing of the holder 8. The middle portion of the casing can have a dip or cavity from the bottom, and/or have dips on the sides for easier grip with the fingers to detach from the metal plate in a stored (stowed) position before wearing the holder 8.

FIG. 1 illustrates a user storing the eyeglasses 9 on the metal plate 3 on the user's shirt with both temples making contact with metal plate 3. A magnetic connection is formed between magnet 4 and metal plate 3 for form an assembly. In this case, both temple ends 2A are attached to the metal plate 3. In another embodiment, only a single temple end 2A is attached to the metal plate 3. The user can remove/place the eyeglasses 9 from/on the metal plate with only one hand. The magnet holder is under the user's shirt in this view and is not visible. The eyeglasses 9 are not folded as shown in this FIG. 1. In FIG. 2, one of temples 2 is folded while the other temple makes contact with metal plate 3.

Figure 3:
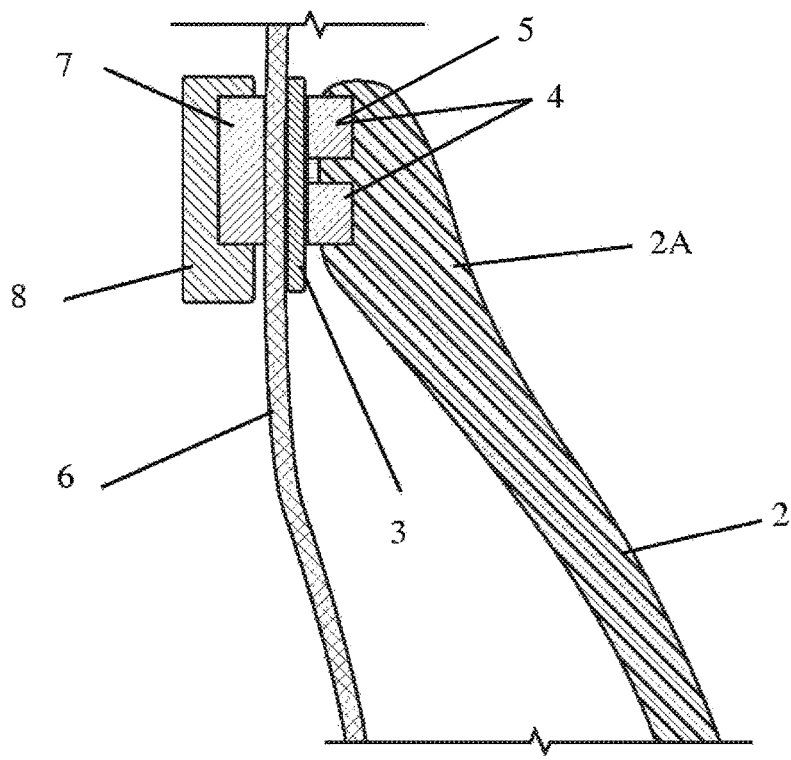
FIG. 3 illustrates a cross-section of the assembly of the eyeglasses, metal plate, and magnets inside of the user's article of clothing.

FIG. 3 illustrates a cross-section view of the assembly illustrated in FIG. 1. Magnet holder 8 is placed inside of the article of clothing 6. The magnet 7 of the magnet holder 8 makes a magnetic connection with plate 3 on the outside of the article of clothing 6. The temple end 2A is also attached to the metal plate 3 with the magnet 4 at end of the temple end 2A.

Figure 4:
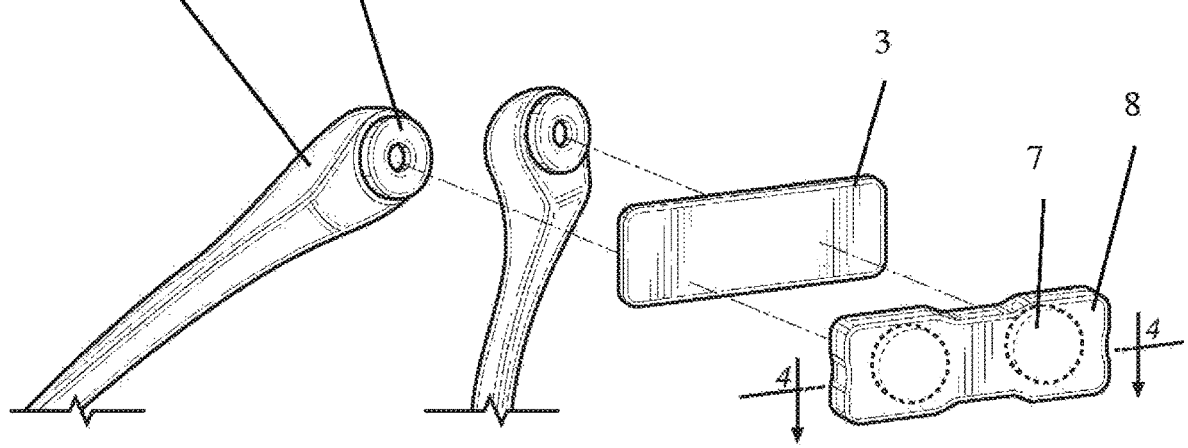
FIG. 4 illustrates the components of the assembly illustrated in FIG. 2.

FIG. 4 illustrates each component of the holding or retaining system that forms an on a person's article of clothing 6. The magnet 4 at end of the temple makes a magnetic connection with the metal plate 3. The two circular magnets 7 of the magnet holder 8 also make a magnetic connection with the metal plate 3.

Figure 5:
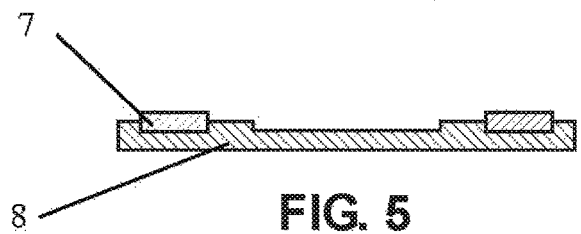
FIG. 5 illustrates a cross-section of the magnet holder that is placed inside an article of clothing.

FIG. 5 illustrates a cross-section of the magnet holder 8. The two circular magnets 7 are placed each in a cavity in the of the magnet holder 8. The middle portion of magnet holder 8 has a raised profile in the middle that allows for a gap/space for gripping the magnet holder. The middle portion also has a smaller width in comparison to the ends of magnet holder 8 to further allow for easy grip.

Figure 6:
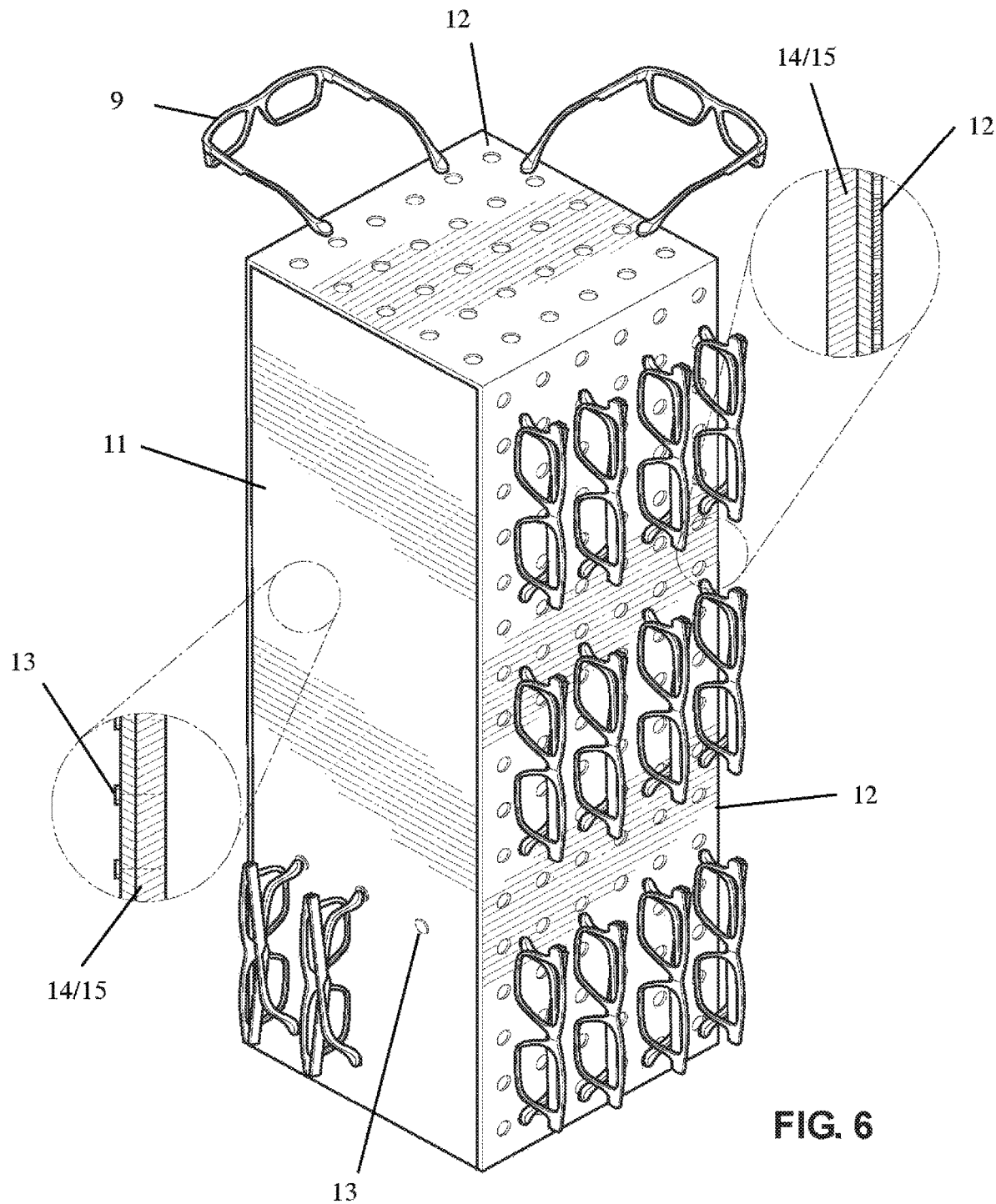
FIG. 6 illustrates a display.
Figure 8:
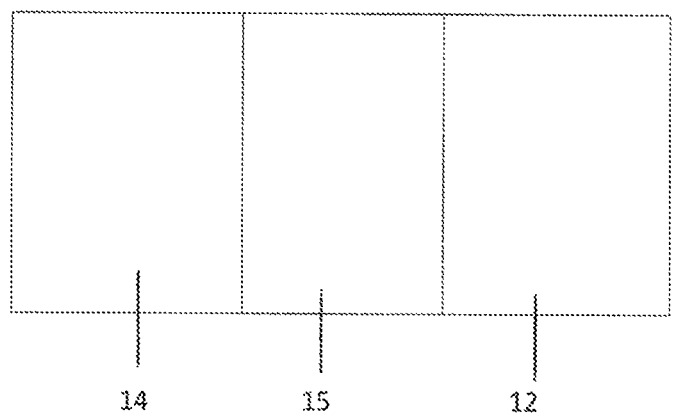
FIG. 8 illustrates the layers of the walls of the display.

FIG. 6 illustrates a retail display 11. The display 11 can be made from a cardboard box by placing a wood layer inside of the box on the sides (and optionally on top) to support the weight of the display and to secure any fasteners/connectors. The display can rest on a surface and use the wood to support its weight on the surface. The display 11 can have two or more surfaces at an angle to each other, such as four flat surfaces (or faces) arranged in a cuboid, and can have a filled top. The display 11 can have metal on the outside to attract magnet 4 at the temple tip 2A. The metal can be in the form of a metal sheet or thumbtacks. FIG. 6 illustrates a cross-section of the display with a metal plate. Wood layer 14 is inside, followed by paper layer (cardboard) 15, followed by metal layer 12 (FIG. 8). The same arrangement can be done except that the metal 12 is in form of individual thumbtacks rather than a metal plate 12. The metal plate 12 can be about 1-4 mm thick and can a plurality of openings that can be used to fasten it to the wood layer with nails or other connectors. Each display can use only thumbtacks 13, only metal plates 12, or combinations.

Figure 7:
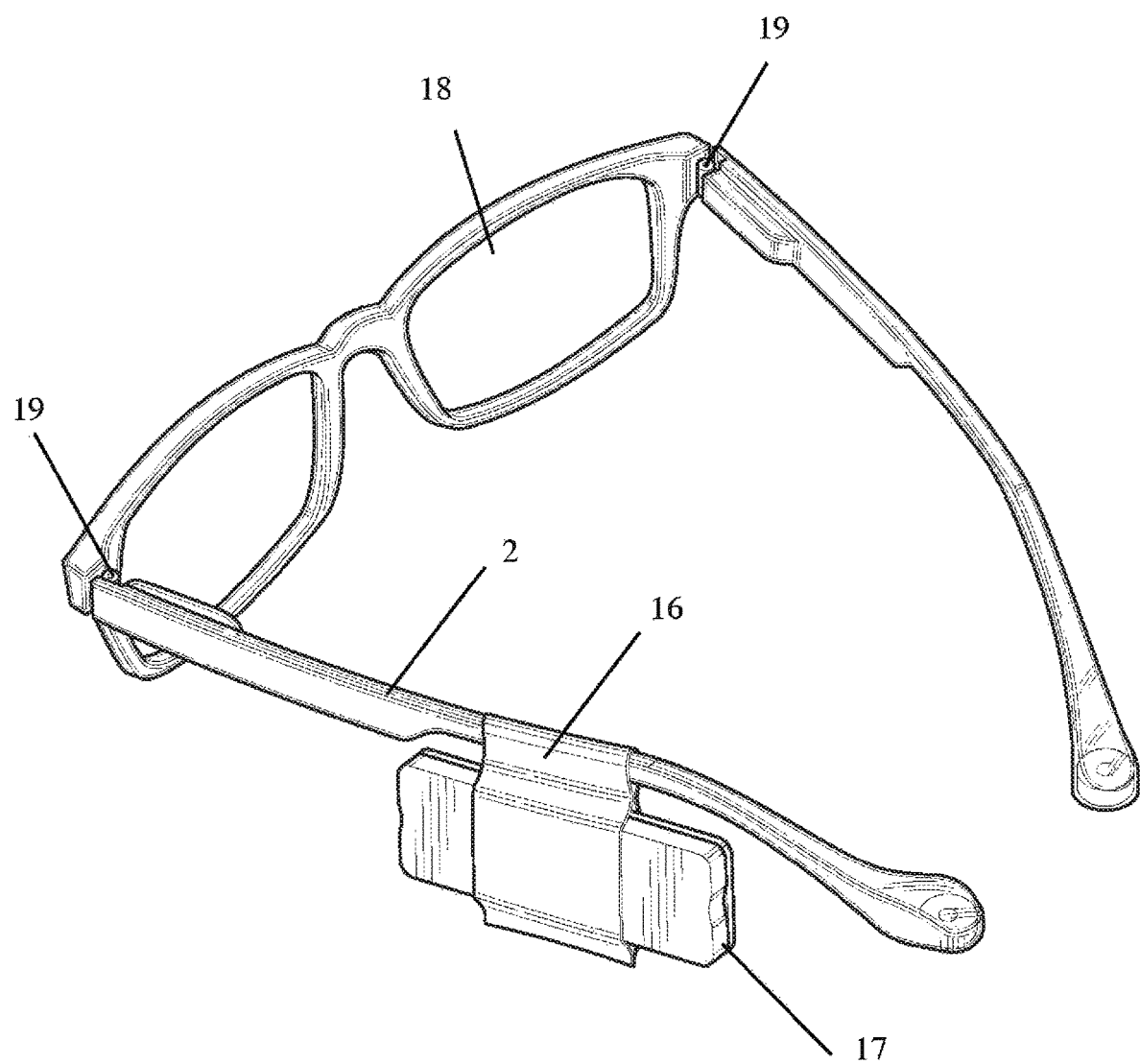
FIG. 7 illustrates a retail package for display and sale of the eyeglasses.

FIG. 7 illustrates a retail package for display and sale of the eyeglasses. Metal plate 3 makes direct contact with magnet holder 8 to form an assembly. The assembly is kept on one of the temples 2 with a sheet 16 having an adhesive layer. The sheet 16 can be a plastic sheet like vinyl and can wrap around the assembly 17 and the temple 2 with the adhesive on the inside and a shiny non-adhesive layer on the outside for placing marks and instructions.

REFERENCES

1. Front body of eyeglasses
2. temple
2A. temple end
3. plate
4. magnet
5. magnet cavity
6. article of clothing
7. magnet
8. magnet holder
9. eyeglasses
10. hand of user
11. display
12. metal plate
13. thumbtacks
14. wood layer
15. paper layer
16. sheet
17. assembly of metal plate 3 with magnet holder 8.
18. Lens
19. Hinge

What is claimed is:

1. Eyeglasses comprising:
   a) a front body for holding lenses and optionally one or more of the lenses;
   b) two temples, each temple having a first end and a second end, the first end attached to the front body, each of the second ends of the temples configured to rest on behind an ear, each of the second end of the temple having a cavity;
   c) a ring-shaped round shaped magnet with a central opening placed in the cavity of each of the temples, wherein the cavity is configured to receive the magnet;
   wherein the eyeglasses are configured to form magnetic connection on one or both temples with a same side of a planar surface of an external metal,
   wherein the second end of each temple is circular in a horizontal direction plane when the eyeglasses are placed on a flat surface in a position that is worn by a person with the temples at open position,
   wherein the second end of the temple is thicker in a horizontal direction plane than in a vertical direction when the eyeglasses are placed on a flat surface in a position that is worn by a person with the temples at open position.

2. The eyeglasses of claim 1, wherein the eyeglasses are configured to be attached and removed from the metal without a need for folding the eyeglasses.

3. The eyeglasses of claim 1, wherein in the magnetic connection, the eyeglasses are not folded.

4. The eyeglasses of claim 1, wherein a surface of the magnets protrudes out of the cavity configured to make contact with the external metal in relation to the end of the temple.

5. The eyeglasses of claim 1, wherein the magnet configured to make contact with the external metal has a flat surface and is in an approximately horizontal plane when the eyeglasses are placed on a flat surface in a position that is worn by a person with the temples at open position.

6. Eyeglasses holding system comprising:
   a) a metal plate attracted to a magnet for wearing on outside of an article of clothing;
   b) one or more magnets for placing inside of the article of clothing; and
   c) eyeglasses with a front body for holding lenses and two temples, with at least one ring-shaped round shaped magnet with a central opening in each of the two temples;
   wherein a user places the one or more magnets inside of the article of clothing and forms a first magnetic connection between the one or more magnets and the metal plate placed on the outside of the article of clothing, the first magnetic connection stabilizing the metal plate on the outside of the article of clothing, the stabilized metal plate configured for placing the eyeglasses on a same side of the metal plate though a second magnetic connection as needed by the user with one or both temples,
   wherein the second end of the temple is thicker in a horizontal direction plane than in a vertical direction when the eyeglasses are placed on a flat surface in a position that is worn by a person with the temples at open position.

7. The eyeglasses holding system of claim 6, wherein two magnets are placed inside of the article of clothing.

8. The eyeglasses holding system of claim 7, further comprising a non-metal casing for the two magnets.

9. The eyeglasses holding system of claim 6, wherein the metal plate is flat.

10. The eyeglasses holding system of claim 6, wherein the metal plate is not a magnet and does not hold a magnet inside.

11. The eyeglasses holding system of claim 6, wherein the metal plate and the magnets are detachably attached to the temple.

12. The eyeglasses holding system of claim 6, wherein the system is packaged by having the one or more magnets and the metal plate forming an assembly, and then attaching the assembly to one of the temples with an adhesive sheet.

13. Eyeglasses comprising:
   a) a front body for holding lenses and optionally one or more of the lenses:
   b) two temples, each temple having a first end and a second end, the first end attached to the front body, each of the second ends of the temples configured to rest on behind an ear, each of the second end of the temple having a cavity:
   c) a ring-shaped round magnet placed in the cavity of each of the temples,
   wherein each of the temples of the eyeglasses are configured to form a magnetic connection with a same side of a planar surface of an external metal while the glasses are in an unfolded position;
   wherein the second end of each temple is in a horizontal direction plane when the eyeglasses are placed on a flat surface in a position that is worn by a person with the temples at open position,
   wherein the second end of the temple is thicker in a horizontal direction plane than in a vertical direction when the eyeglasses are placed on a flat surface in a position that is worn by a person with the temples at open position.

14. The eyeglasses of claim 13, wherein the magnets have a horizontal orientation when the glasses are also put on a surface in a horizontal orientation.

15. The eyeglasses of claim 13, wherein a surface of the magnets protrudes out of the cavity configured to make contact with the external metal in relation to the end of the temple.

16. The eyeglasses of claim 13, wherein the second end of the temple is thicker in a horizontal direction plane than in a vertical direction when the eyeglasses are placed on a flat surface in a position that is worn by a person with the temples at open position.

17. The eyeglasses of claim 13, wherein the magnets have a horizontal orientation when the glasses are also put on a surface in a horizontal orientation, wherein a surface of the magnet configured to make contact with the external metal protrudes out of the cavity in relation to the end of the temple.

\* \* \* \* \*